United States Patent
Giles et al.

(10) Patent No.: US 7,330,663 B2
(45) Date of Patent: Feb. 12, 2008

(54) PMD-REDUCTION PROCESSING FOR A MULTI-CHANNEL RECEIVER

(75) Inventors: Randy C. Giles, Whippany, NJ (US); Xiang Liu, Marlboro, NJ (US); Chongjin Xie, Aberdeen, NJ (US)

(73) Assignee: Lucent technologies Inc., Murray Hill, NJ (US)

( * ) Notice: Subject to any disclaimer, the term of this patent is extended or adjusted under 35 U.S.C. 154(b) by 649 days.

(21) Appl. No.: 10/425,432

(22) Filed: Apr. 29, 2003

(65) Prior Publication Data

US 2003/0223758 A1 Dec. 4, 2003

Related U.S. Application Data

(60) Provisional application No. 60/385,304, filed on Jun. 3, 2002.

(51) Int. Cl.
*H04B 10/12* (2006.01)
(52) U.S. Cl. .................. 398/147; 398/136; 398/148
(58) Field of Classification Search .............. 398/29, 398/119, 136, 147, 148
See application file for complete search history.

(56) References Cited

U.S. PATENT DOCUMENTS

| | | | |
|---|---|---|---|
| 5,965,874 A * | 10/1999 | Aso et al. | 250/225 |
| 6,512,615 B2 * | 1/2003 | Wu et al. | 398/87 |
| 2001/0008452 A1 * | 7/2001 | Sugihara et al. | 359/124 |
| 2001/0055437 A1 * | 12/2001 | Khosravani et al. | 385/11 |
| 2002/0145787 A1 * | 10/2002 | Shpantzer et al. | 359/136 |

* cited by examiner

*Primary Examiner*—Dzung Tran

(57) ABSTRACT

A multi-channel (e.g. WDM) receiver, in which l PMD compensators are time-shared by n (n>1) communication channels, where $1 \leq l \leq n-1$. The receiver implements PMD monitoring to identify channels exhibiting relatively high amounts of PMD. Some or all of the identified channels are then subjected, before decoding, to PMD-reduction processing, while the remaining channels are decoded without such processing. Channel allocation for the processing may be changed dynamically depending on the current amounts of PMD exhibited by various channels. Due to efficient utilization of PMD compensators, multi-channel receivers of the invention are capable of performance comparable to that of the corresponding fully compensated (i.e., having a dedicated PMD compensator for each channel) receivers, but at appreciably lower cost.

28 Claims, 7 Drawing Sheets

PMD-REDUCTION PROCESSING FOR A MULTI-CHANNEL RECEIVER

CROSS-REFERENCE TO RELATED APPLICATIONS

This application claims priority from U.S. Provisional Patent Application No. 60/385,304 filed Jun. 3, 2002, and entitled "Multi-Channel Shared PMD Compensation in WDM Systems."

BACKGROUND OF THE INVENTION

1. Field of the Invention

The present invention relates to optical communication equipment and, more specifically, to reducing effects of polarization mode dispersion (PMD).

2. Description of the Related Art

Polarization mode dispersion (PMD) occurs in an optical fiber as a result of small birefringence induced by deviations of the fiber's core from a perfectly cylindrical shape, asymmetric stresses or strains, and/or random external forces acting upon the fiber. Due to PMD, two polarization components of an optical signal corresponding to two principle states of polarization (PSP) travel in a fiber at different speeds and arrive at the receiver with a differential group delay (DGD). As a result, optical pulses corresponding to optical bits may be significantly distorted, resulting in errors at the receiver. In addition, PMD is a wavelength-dependent phenomenon. That is, the amount (level) of PMD imparted by the same optical fiber will generally be different for two optical signals simultaneously traversing that fiber when those signals correspond to different optical communication channels (wavelengths).

Several techniques have been proposed to date to mitigate the effects of PMD in optical communication systems. Typically, a device known as a PMD compensator is deployed at the receiver end of a fiber transmission link to improve the chances that the receiver correctly decodes PMD-distorted optical bits.

FIG. 1 illustrates an exemplary prior art PMD compensator (PMDC) 100. Compensator 100 comprises a polarization controller (PC) 102, a DGD element 104, a PMD monitoring unit (MU) 106, and control electronics 108. During operation, PC 102 receives a PMD-distorted optical signal and separates it into two PSP components. DGD element 104 subjects the faster PSP component to a compensating delay to realign it with the slower PSP component. The two PSP components are then recombined and directed to, e.g., a receiver (not shown) for decoding. The output of DGD element 104 is tapped and analyzed by MU 106, which is configured to provide feedback to PC 102 and DGD element 104 via signals 112 and 110, respectively, generated by control electronics 108. Based on those signals, PC 102 and DGD element 104 adaptively change their settings to correspond to the dynamically varying amount of PMD in the transmission link. Certain implementations of compensator 100 are described in commonly owned U.S. Pat. No. 5,930,414 by Fishman, et al., the teachings of which are incorporated herein by reference.

FIG. 2 illustrates a prior art multi-channel receiver 200 that is typically used in wavelength division multiplexing (WDM) communication systems affected by PMD. Multi-channel receiver 200 employs a plurality of PMD compensators 100, where each channel has a dedicated compensator. A WDM signal 202 applied to multi-channel receiver 200 and having n WDM components (labeled $\lambda_1$-$\lambda_n$ in FIG. 2), each corresponding to a different communication channel, is decomposed into n signals 206-1-206-n using a de-multiplexer (DMUX) 204. Each signal 206 is then processed by a corresponding PMD compensator 100, e.g., as described above, and decoded by a corresponding single-channel receiver 212 of a receiver array 210.

One problem with multi-channel receiver 200 is that it is relatively expensive to implement primarily due to the cost associated with multiple PMD compensators 100. This problem is progressively exacerbated due to the quickly increasing number of channels in modern WDM communication systems, often having 32 or more WDM channels and hence requiring a corresponding number of PMD compensators.

SUMMARY OF THE INVENTION

The problems in the prior art are addressed, in accordance with the principles of the present invention, by a multi-channel (e.g. WDM) receiver, in which l PMD compensators are time-shared by n (n>1) communication channels, where $1 \leq l < n$. The receiver implements PMD monitoring to identify channels exhibiting relatively high amounts of PMD. Some or all of the identified channels are then subjected, before decoding, to PMD-reduction processing, while the remaining channels are decoded without such processing. Channel allocation for the processing may be changed dynamically depending on the current amounts of PMD exhibited by various channels. Due to efficient utilization of PMD compensators, multi-channel receivers of the invention are capable of performance comparable to that of the corresponding fully compensated (i.e., having a dedicated PMD compensator for each channel) receivers, but at appreciably lower cost.

According to one embodiment, the present invention is a method of processing an optical signal having n components, where n>1, the method comprising: applying the optical signal to a device including l PMD compensators, where $1 \leq l < n$; and subjecting the optical signal to PMD-reduction processing, wherein said l PMD compensators are time-shared for said processing.

According to another embodiment, the present invention is a method of processing an optical signal having n components, where n>1, the method comprising: characterizing PMD levels of the n components; selecting p of the n components based on the characterized PMD levels, where $0 \leq p < n$; and applying PMD-reduction processing to the p selected components.

According to yet another embodiment, the present invention is an apparatus adapted to receive an optical signal having n components, where n>1, comprising: a PMD monitor adapted to characterize PMD levels of the n components; a controller adapted to select p of the n components based on the characterized PMD levels, where $0 \leq p < n$; and l PMD compensators, where $1 \leq l < n$, wherein said l PMD compensators are adapted to apply PMD-reduction processing to the p selected components.

BRIEF DESCRIPTION OF THE DRAWINGS

Other aspects, features, and benefits of the present invention will become more fully apparent from the following detailed description, the appended claims, and the accompanying drawings in which:

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 2:
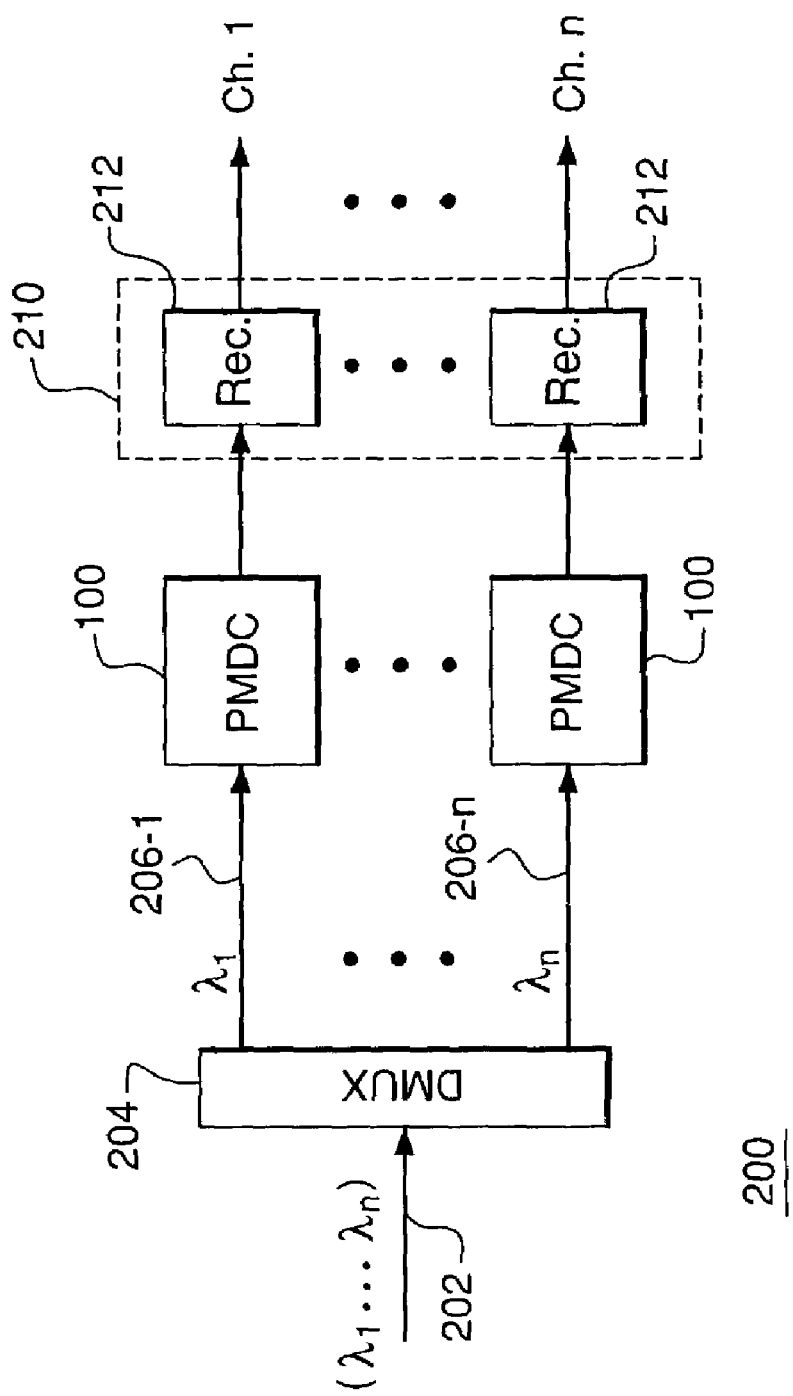
FIG. 2 shows a block diagram of a prior art multi-channel receiver used in communication systems affected by PMD.
Figure 3:
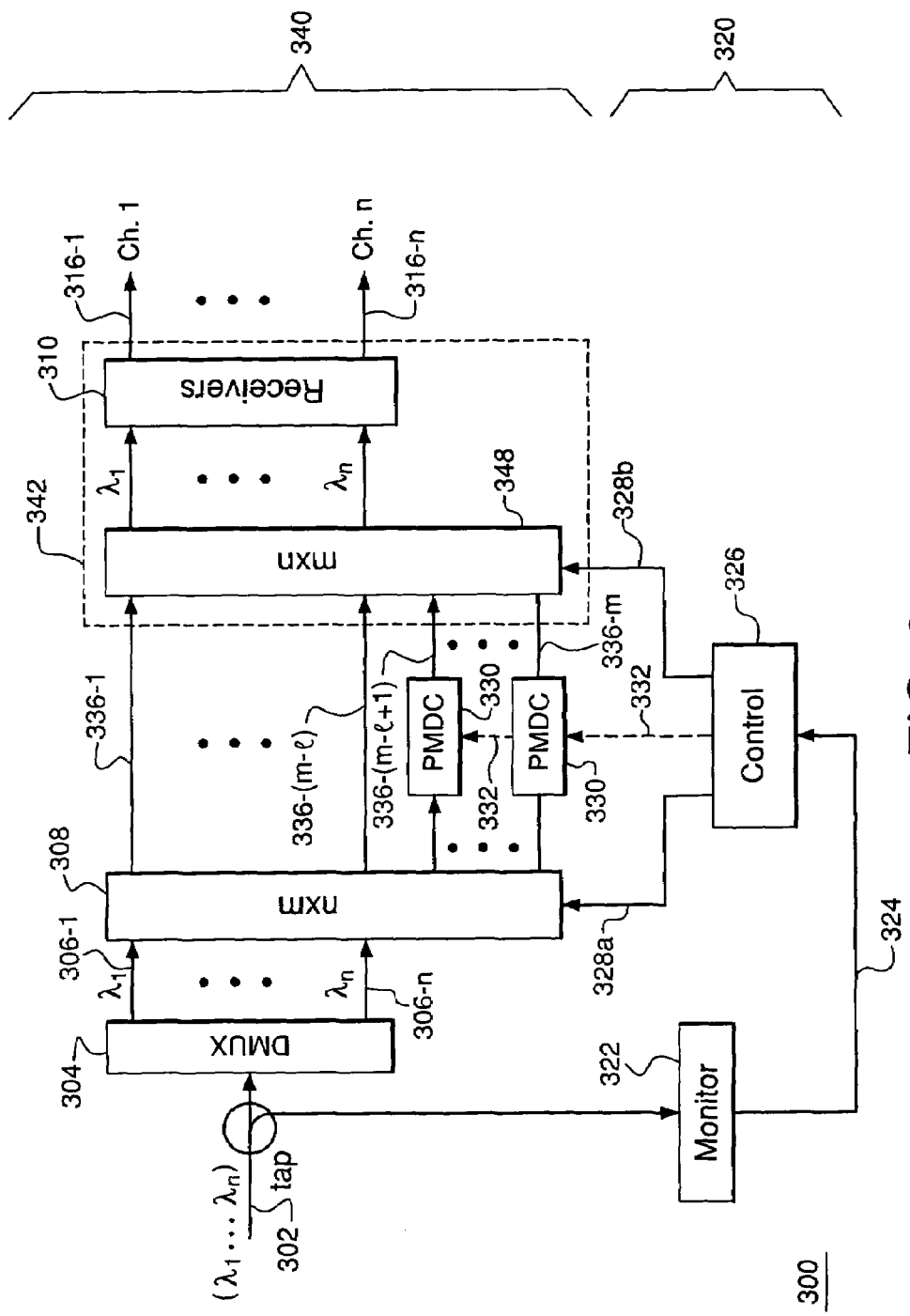
FIG. 3 shows a block diagram of a multi-channel receiver according to one embodiment of the present invention.

FIG. 3 shows a block diagram of a multi-channel receiver 300 according to one embodiment of the present invention. Similar to multi-channel receiver 200 (FIG. 2), multi-channel receiver 300 receives an optical WDM signal 302 having n WDM components (labeled $\lambda_1$-$\lambda_n$ in FIG. 3), each corresponding to a different WDM channel, and outputs n decoded electrical signals 316-1-316-n. However, instead of using n PMD compensators per n WDM channels, as in multi-channel receiver 200, multi-channel receiver 300 employs l (where $1 \leq l \leq n-1$) PMD compensators that are time-shared between the n WDM channels.

Multi-channel receiver 300 implements signal processing in which WDM channels are divided into two groups based on the exhibited amount of PMD. More specifically, the first and second groups include channels having relatively high and low, respectively, amounts of PMD. In receiver 300, some or all of the channels belonging to the first group are subjected to PMD-reduction processing before decoding, while the remaining (if any) channels of the first group and all channels belonging to the second group are decoded without such processing. Channel allocation for the processing may be changed dynamically based on the current amount of PMD corresponding to each channel. It will be shown below that, due to the efficient utilization of the available PMD-compensation resources, multi-channel receiver 300 is capable of performance comparable to that of multi-channel receiver 200. At the same time, due to the use of fewer PMD compensators, the cost of receiver 300 may be appreciably less than that of receiver 200.

Figure 1:
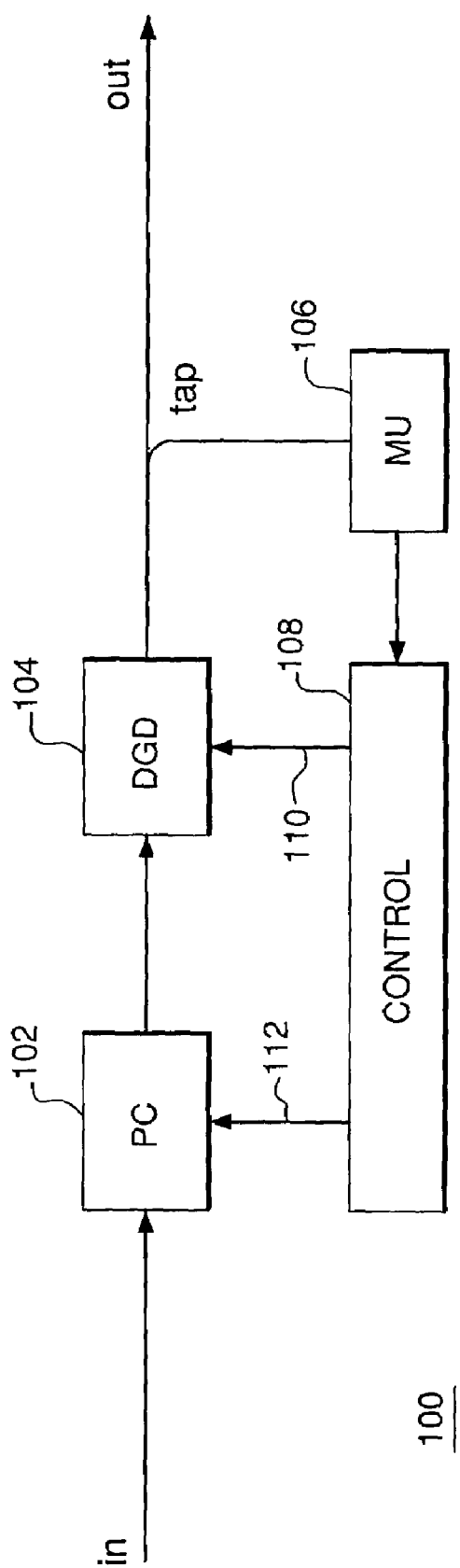
FIG. 1 shows a block diagram of an exemplary prior art PMD compensator.

Multi-channel receiver 300 comprises (i) a signal processor 340 including l PMD compensators 330, each analogous to PMD compensator 100 (FIG. 1), and (ii) a monitor and control unit 320 configured to provide control signals for the signal processor. Monitor and control unit 320 includes a PMD monitor 322 coupled to a control circuit (controller) 326. PMD monitor 322 is a device designed to measure the amount of PMD for a selected WDM component of signal 302 using techniques known in the art such as, for example, degree of polarization measurements, RF spectrum analyses, and/or DGD monitoring.

PMD monitor 322 receives a portion of signal 302 using an optical tap and continuously evaluates PMD for different WDM components of that signal, for example, by selecting one component at a time in a particular sequence and measuring the amount of PMD for the selected component. Representative tuning (channel locking) time for PMD monitor 322 is on the order of several microseconds. Once PMD monitor 322 has locked onto a particular WDM channel, it takes several more microseconds to measure the amount of PMD corresponding to that channel before the monitor can lock onto a next channel. Therefore, when designed for use in a system having 32 WDM channels, PMD monitor 322 will typically take on the order of one millisecond to obtain (update) information about PMD for all 32 channels. Since the typical time scale of PMD variation is on the order of seconds, minutes, or even hours, relatively accurate (current) information about the current amount of PMD for each WDM channel can continuously be provided by PMD monitor 322.

Control circuit 326 is configured to process the output of PMD monitor 322 (labeled as signal 324 in FIG. 3) and generate instructions for signal processor 340 that are forwarded to the processor via signals 328a-b. In addition, depending on the particular type of compensators 330, control circuit 326 may also generate an optional control signal 332 for the compensators. For example, for each WDM component of signal 302, control circuit 326 may (i) receive via signal 324 a value representing the current amount of PMD for that component, (ii) compare the received value with a selected threshold value (which may be channel-dependent), and (iii) based on the comparison, assign the WDM component to one of the above-mentioned two groups. Then, control circuit 326 generates signals 328a-b to instruct processor 340 to route (i) some or all of the WDM components assigned to the first (i.e., at- or over-the-thresholds) group via PMD compensators 330 and (ii) the remaining (if any) WDM components of the first group and the WDM components assigned to the second (i.e., below-the-thresholds) group around those compensators.

In one configuration, control circuit 326 employs appropriate conflict-resolution algorithms, if the number of WDM components assigned to the first group exceeds l. For example, control circuit 326 may instruct processor 340 to route l WDM components currently having the l highest amounts of PMD via PMD compensators 330 and all other WDM components around those compensators. Alternatively, control circuit 326 may instruct processor 340 to route WDM components currently assigned to the first group via compensators 330 on a "first-come, first-served" basis. More specifically, after the number of WDM components assigned to the first group exceeds l, control circuit 326 is configured to form a wait list, in which the WDM components newly assigned to the first group are listed in the chronological order of the assignment. The wait list is then used to route the wait-listed WDM components via compensators 330 when a "compensator vacancy" becomes available, e.g., due to reassignment of one or more WDM components to the second group. In different configurations, different appropriate conflict-resolution algorithms may be utilized.

In one embodiment, processor 340 includes a de-multiplexer (DMUX) 304 that, similar to de-multiplexer 204 of multi-channel receiver 200 (FIG. 2), decomposes signal 302 into n signals 306-1-306-n that are then applied to input ports of an optical switch 308. Switch 308 is an n×m ($m \geq n$) optical switch controlled by circuit 326 via signal 328a and having n input ports and m output ports, which m output ports are coupled to m input ports of a decoder 342. More specifically, (m−l) output ports of switch 308 are coupled to (m−l) input ports of decoder 342 directly, while each of the remaining l output ports of switch 308 is coupled to a corresponding input port of the decoder via a corresponding compensator 330.

In one implementation of processor 340, numbers m and l are selected such that m=n+l. For this implementation, at one extreme, all WDM components of signal 302 may be directed for decoding without PMD-reduction processing, and, at the other extreme, as many as l WDM components of signal 302 may be subjected to PMD-reduction processing before decoding. Hence, over time, the number of WDM components undergoing PMD-reduction processing may vary between 0 and l. In other possible implementations of processor 340, different combinations of m and l may be selected without departing from the scope and principle of the present invention.

Decoder 342 is controlled by circuit 326 via signal 328b and is configured to process optical signals 336-1-336-m applied to the decoder to generate corresponding electrical signals 316-1-316-n. In the embodiment illustrated in FIG. 3, decoder 342 includes an optical switch 348 and a receiver array 310. Switch 348 is an m×n optical switch having m input ports and n output ports. Based on control signal 328b, switch 348 selects n of the m signals 336 and routes those n selected signals to the corresponding appropriate output ports of the switch. As already indicated above, depending on the routing pattern imposed by switch 308, each selected signal 336 routed to a particular output port of switch 348 may come from switch 308 either directly or via one of compensators 330. Receiver array 310 coupled to switch 348 then decodes the n optical signals received from that switch to generate electrical signals 316-1-316-n.

Figure 4:
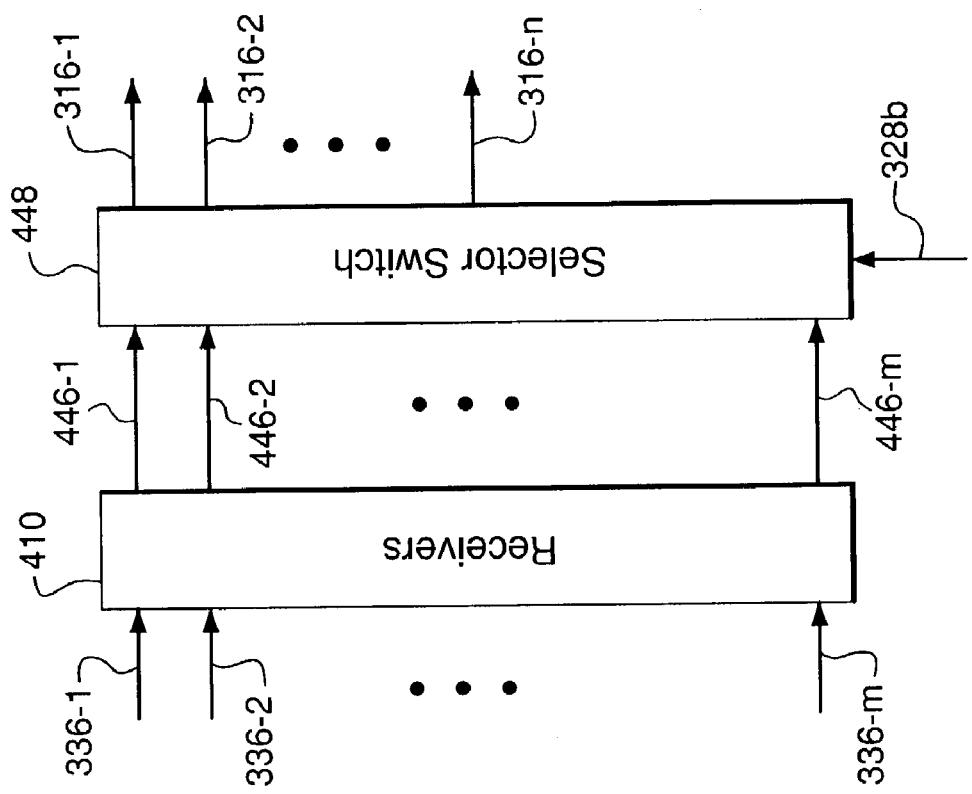
FIG. 4 shows a block diagram of a decoder that can be used in the multi-channel receiver of FIG. 3 according to another embodiment of the present invention.

FIG. 4 schematically shows a decoder 442 that can be used in place of decoder 342 in multi-channel receiver 300 according to another embodiment of the present invention. In decoder 442, signals 336-1-336-m are applied to a receiver array 410 that generates corresponding electrical signals 446-1-446-m. These electrical signals are then applied to a selector switch 448 designed to perform in the electrical domain routing similar to that of optical switch 348 (FIG. 3) performed in the optical domain. More specifically, switch 448 is an m×n selector switch having m input ports and n output ports. Based on control signal 328b, switch 448 selects n of the m electrical signals 446 and routes the n selected electrical signals to the output ports of the switch to generate electrical signals 316-1-316-n.

Figure 5:
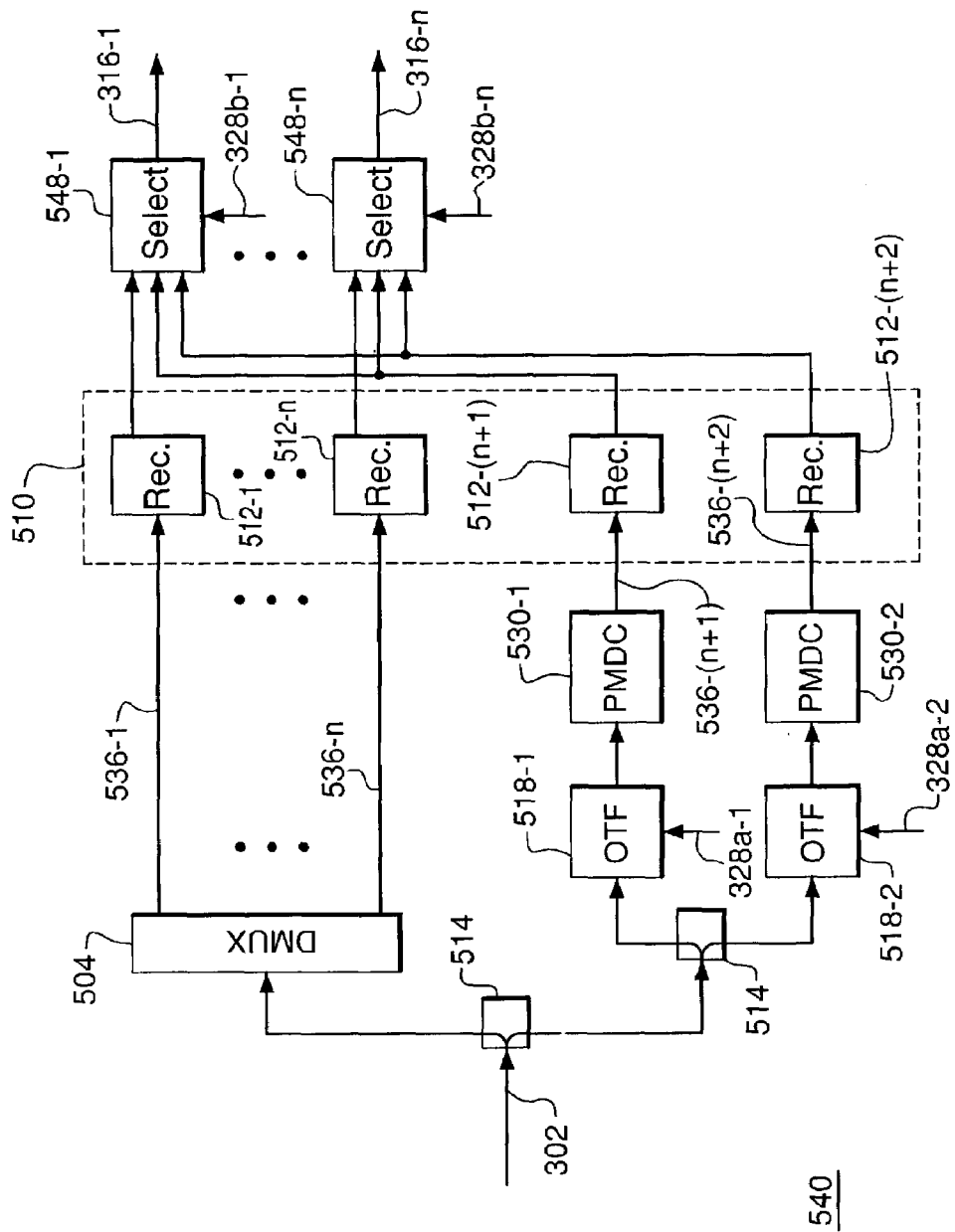
FIG. 5 shows a block diagram of a signal processor that can be used in the multi-channel receiver of FIG. 3 according to another embodiment of the present invention.

FIG. 5 schematically shows a processor 540 that can be used in place of processor 340 in multi-channel receiver 300 according to another embodiment of the present invention. More specifically, processor 540 is analogous to processor 340 implemented with l=2 and m=n+2.

WDM signal 302 applied to processor 540 is split into three copies using two optical splitters 514. One copy of signal 302 is applied to a de-multiplexer 504 that is similar to de-multiplexer 304 (FIG. 3), and each of the remaining two copies is applied to a corresponding optical tunable filter (OTF) 518. Each filter 518 is a tunable device designed to pass a selected component of the WDM signal while rejecting all other components. In processor 540, each of filters 518-1 and 518-2 is tuned based on the corresponding control signal 328a (i.e., one of signals 328a-1 and 328a-2). The output of each filter 518 is coupled to a corresponding PMD compensator 530 that is analogous to compensator 100 of FIG. 1. In one embodiment, filter 518 is a voltage-controlled optical filter model VCF050, available from JDS Iniphase, Inc., of San Jose, Calif.

The outputs of de-multiplexer 504 (labeled as signals 536-1-536-n in FIG. 5) and the outputs of compensators 530-1 and 530-2 (labeled as signals 536-(n+1) and 536-(n+2), respectively) are coupled to a receiver array 510 comprising (n+2) single-channel receivers 512-1-512-(n+2). The (n+2) outputs of receiver array 510 are coupled to n selectors 548 (labeled 548-1-548-n in FIG. 5). Each selector 548 has three input ports and one output port and is controlled by a corresponding control signal 328b (i.e., one of signals 328b-1-328b-n) generated by control circuit 326 (FIG. 3). Based on the control signal, each selector 548 can select a signal applied to any one of its three input ports and output that signal at the output port as the corresponding signal 316.

For each selector 548-i ($1 \leq i \leq n$), the first input port is coupled to the corresponding receiver 512-i; the second input port is coupled to receiver 512-(n+1); and the third input port is coupled to receiver 512-(n+2). Since processor 540 corresponds to a configuration in which m=n+2, up to two components of WDM signal 302 may be subjected to PMD-reduction processing. Therefore, in operation, control signals 328b-1-328b-n applied to selectors 548-1-548-n, respectively, represent one of three routing patterns, under which the number of components undergoing PMD-reduction processing may be zero, one, or two. For example, illustratively, under a first routing pattern, control signals 328b-1-328b-n are such that each selector 548 selects the signal applied to its first input port. As a result, signals 316-1-316-n are generated based on signals 536-1-536-n, i.e., without PMD-reduction processing. Under a second routing pattern, control signals 328b-1-328b-n are such that (i) for (n−1) selectors 548, each selector selects the signal applied to its first input port and (ii) the remaining one selector 548 selects the signal applied to its second input port. As a result, (n−1) of signals 316-1-316-n are generated based on (n−1) of signals 536-1-536-n, i.e., without PMD-reduction processing, and one of signals 316-1-316-n is generated based on signal 536-(n+1), i.e. with such processing. Under a third routing pattern, control signals 328b-1-328b-n are such that (i) for (n−2) selectors 548, each selector selects the signal applied to its first input port; (ii) one selector 548 selects the signal applied to its second input port; and (iii) another one selector 548 selects the signal applied to its third input port. As a result, (n−2) of signals 316-1-316-n are generated based on (n−2) of signals 536-1-536-n, i.e., without PMD-reduction processing, and two of signals 316-1-316-n are generated based on signals 536-(n+1) and 536-(n+2), i.e. with such processing.

The following is a representative example of signal processing under the third routing pattern. Suppose that control circuit 326 (FIG. 3) identified the j-th and k-th WDM components ($\lambda_j$ and $\lambda_k$) as the components for PMD-reduction processing. Then, based on signals 328a-1 and 328a-2, filters 518-1 and 518-2 are tuned to pass the j-th and k-th WDM components, respectively. Based on signals 328b-1-328b-n, selectors 548-1-548-n are configured as follows. Selector 528-j is configured to select the signal applied to its second input port, i.e., the signal generated by receiver 512-(n+1); selector 528-k is configured to select the signal applied to its third input port, i.e., the signal generated by receiver 512-(n+2); and each of the remaining selectors 512 is configured to select the signal applied to its first input port, i.e., the signal generated by the corresponding one of receivers 512-1-512-n. As a result, signals 316-j and 316-k are generated after the corresponding PMD-reduction processing, while the rest of signals 316 are generated without such processing.

Figure 6:
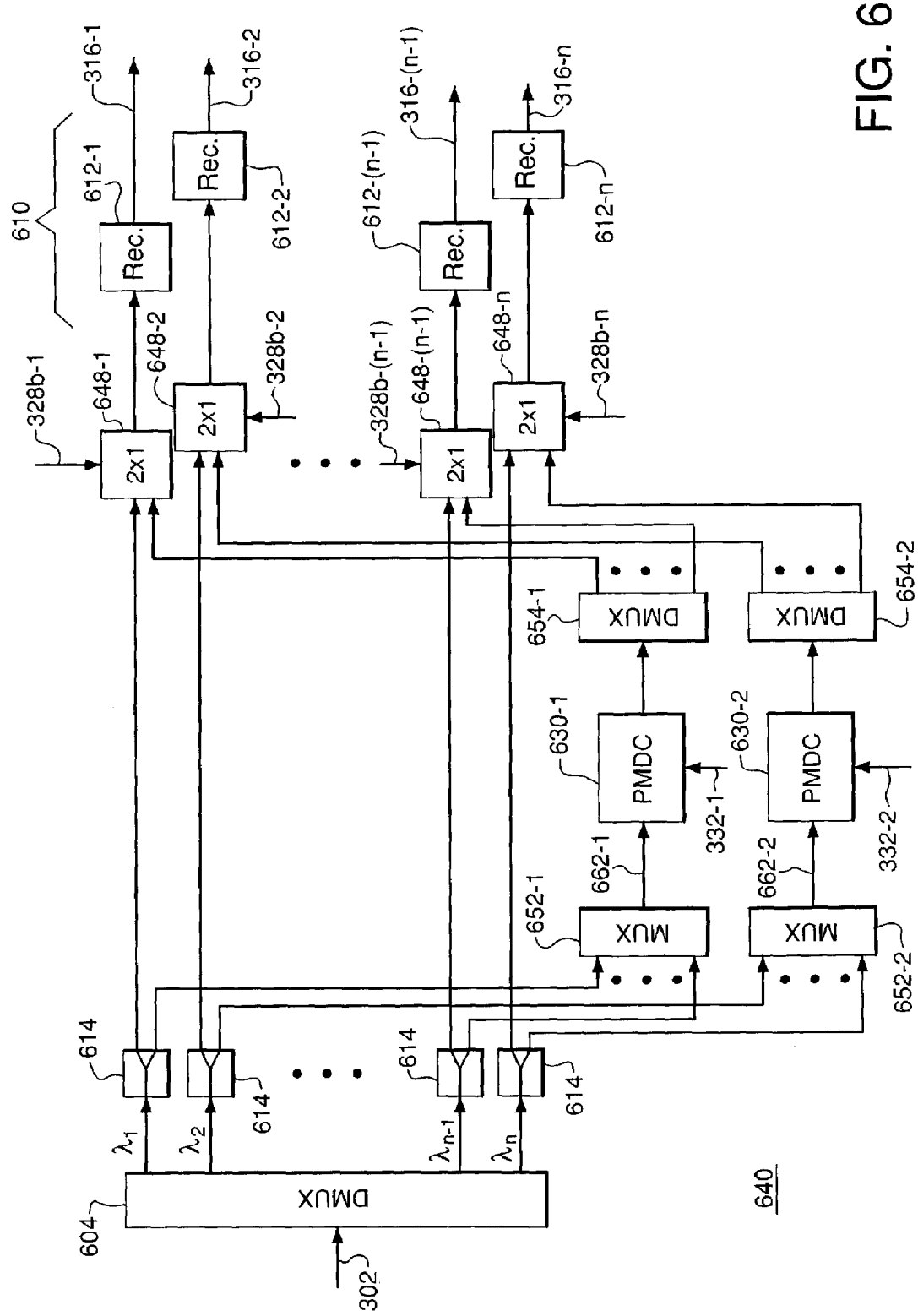
FIG. 6 shows a block diagram of a signal processor that can be used in the multi-channel receiver of FIG. 3 according to yet another embodiment of the present invention.

FIG. 6 schematically shows a processor 640 that can be used in place of processor 340 in multi-channel receiver 300 according to yet another embodiment of the present invention. Similar to processor 540 (FIG. 5), processor 640 is analogous to processor 340 implemented with l=2 and m=n+2. Illustratively, the configuration shown in FIG. 6 corresponds to an even number of channels, i.e., n=2p, where p is an integer.

WDM signal 302 applied to processor 640 is decomposed into n signals ($\lambda_1$-$\lambda_n$) using a de-multiplexer 604, each of which n signals is then split into two copies using a corresponding optical splitter 614. Each first copy is applied to the first input port of a corresponding 2×l optical switch 648, while each second copy is directed to one of multiplexers (MUXes) 652-1 and 652-2. Illustratively, signals corresponding to the odd-numbered channels are applied to multiplexer 652-1, while signals corresponding to the even-numbered channels are applied to multiplexer 652-2. Each of switches 648-1-648-n has two input ports and one output port and is controlled by control signal 328b (i.e., one of signals 328b-1-328b-n) generated by control circuit 326 (FIG. 3). Based on the control signal, each switch 648 can route the signal applied to one of its input ports to the output port while blocking the signal applied to the other input port.

Each multiplexer 652 combines the received signals into a corresponding WDM signal 662 then coupled into a corresponding PMD compensator 630. Each compensator 630 is controlled by a corresponding control signal 332 generated by control circuit 326 (FIG. 3) and identifying the channel selected for PMD-reduction processing by that particular compensator. Since, as already indicated above, the amount of PMD is likely different for different communication channels, it is possible that only the selected channel is improved by such processing in the compensator, while other communication channels treated by the same compensator are in fact deteriorated. The signal output by compensator 630 is decomposed into p signals, each corresponding to a different WDM component of signal 662, using a corresponding de-multiplexer 654. De-multiplexers 654-1 and 654-2 are coupled to the second input ports of odd- and even-numbered switches 648, respectively. The signal output by each switch 648 is decoded by a corresponding single-channel receiver 612 of receiver array 610 to generate signals 316-1-316-n.

The following is a representative example of signal processing using processor 640. Suppose that control circuit 326 (FIG. 3) identified the r-th and s-th WDM components ($\lambda_r$ and $\lambda_s$), corresponding to odd- and even-numbered channels, respectively, as the components for PMD-reduction processing. Based on signals 332-1 and 332-2, compensators 630-1 and 630-2 are configured to reduce the amounts of PMD for the r-th and s-th WDM components, respectively. Then, based on signals 328b-1-328b-n, switches 648-1-648-n are configured as follows. Each of switches 648-r and 648-s is configured to output the signal applied to its second input port, while blocking the signal applied to its first input port; and each of the remaining switches 648 is configured to output the signal applied to its first input port, while blocking the signal applied to its second input port. As a result, signals 316-r and 316-s are generated after the corresponding PMD-reduction processing, while the rest of signals 316 are generated without such processing.

Figure 7:
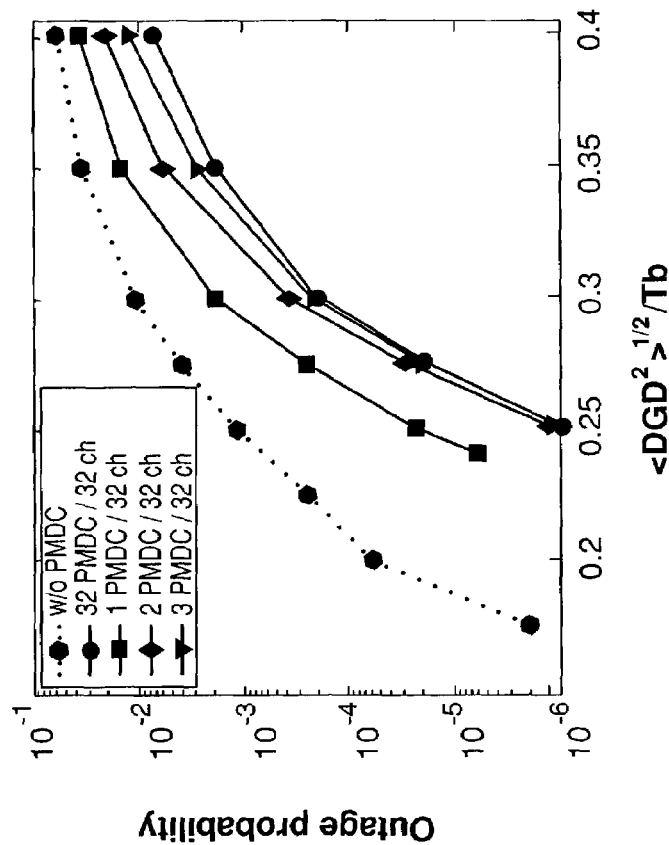

FIG. 7 graphically illustrates the performance of exemplary configurations of multi-channel receiver 300 when signal 302 has 32 WDM components, each a PMD-distorted on-off-keying (OOK) return-to-zero (RZ), 33% duty cycle, pseudo-random bit stream (PRBS). More specifically, FIG. 7 shows outage probability (where outage is defined as an instance of bit error rate (BER) exceeding $10^{-12}$) as a function of the average amount of differential group delay (DGD) in the fiber transmission link, where the DGD amount is measured with respect to the bit period ($T_b$) and the average is taken over all 32 WDM components. Different symbols and/or line styles in FIG. 7 indicate the performance of different configurations of receiver 300, which is compared with the performance of prior-art receiver 200 (FIG. 2). In particular, (i) the solid line with solid circles in FIG. 7 corresponds to receiver 200; (ii) the solid lines with different solid symbols correspond to receiver 300 configured with 1, 2, and 3 PMD compensators, as indicated by the legend in FIG. 7; and (iii) the dotted line with solid circles corresponds to an uncompensated system (i.e., one that does not have a PMD compensator). As can be seen in FIG. 7, the performance of receiver 300 having only 3 PMD compensators (shown by triangles in FIG. 7) closely approaches that of receiver 200, while all configurations of receiver 300 provide significant improvement over the uncompensated system.

Figure 8:
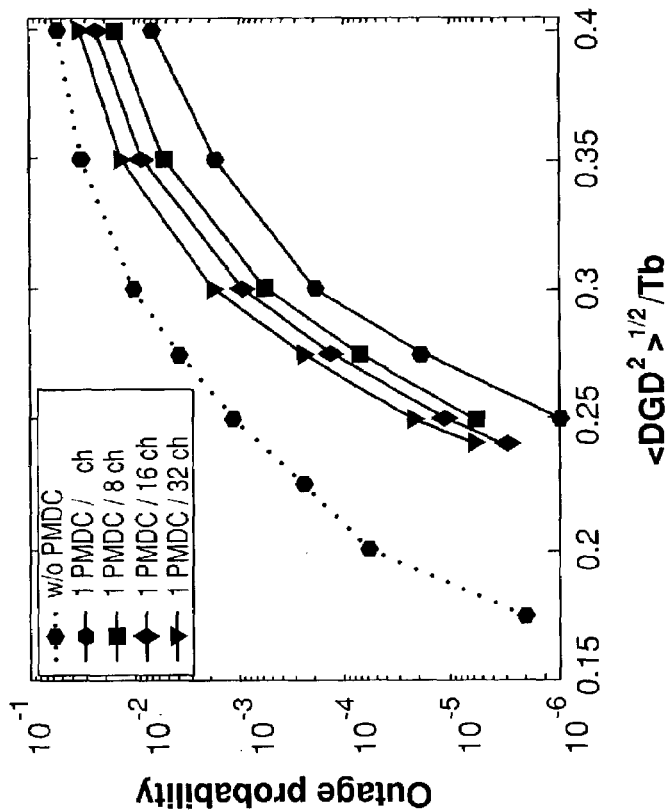
FIGS. 7-8 graphically illustrate the performance of exemplary multi-channel receivers of the present invention.

FIG. 8 is similar to FIG. 7 and graphically illustrates the performance of multi-channel receiver 300 configured with a single PMD compensator. More specifically, (i) the solid line with solid circles in FIG. 8 corresponds to receiver 200 having 32 compensators per 32 channels; (ii) the solid lines with different solid symbols correspond to receiver 300 designed for 8, 16, and 32 channels; and (iii) the dotted line with solid circles corresponds to an uncompensated system. As can be seen in FIG. 8, receiver 300 having just one shared PMD compensator is able to provide significant improvement over the uncompensated system.

While this invention has been described with reference to illustrative embodiments, this description is not intended to be construed in a limiting sense. Various modifications of the described embodiments, as well as other embodiments of the invention, which are apparent to persons skilled in the art to which the invention pertains are deemed to lie within the principle and scope of the invention as expressed in the following claims. For example, the present invention may be practiced in optical communication systems operating at different bit rates and transmitting optical signals using light of different wavelengths. In addition to the exemplary data modulation format illustratively considered in the specification, the present invention may also be practiced for other data modulation formats.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method of processing an optical signal having n components, where n>1, the method comprising:
    characterizing polarization mode dispersion (PMD) levels of the n components;
    selecting p of the n components based on the characterized PMD levels, where $0 \leq p < n$;
    applying PMD-reduction processing to the p selected components;
    decoding each of the p selected components after the corresponding PMD-reduction processing; and
    decoding each of the remaining components without performing PMD-reduction processing thereupon, wherein the method is implemented in a device comprising l PMD compensators, where $1 \leq l < n$, that are time-shared for the PMD-reduction processing, with at least one of the l PMD compensators being configurable to apply the PMD-reduction processing to different selections of components during different periods of time.

2. The method of claim 1, wherein each of the l PMD compensators is configurable to apply the PMD-reduction processing to different selections of components during different periods of time.

3. The method of claim 1, wherein the selection of the p components changes over time.

4. The method of claim 3, wherein the value of p changes over time.

5. The method of claim 1, wherein each component of the optical signal corresponds to a communication channel of an optical communication system.

6. The method of claim 1, wherein the selecting comprises, for each component, comparing the current level of PMD with a threshold value.

7. The method of claim 1, wherein the selecting comprises selecting p components corresponding to the p highest current levels of PMD.

8. The method of claim 1, wherein the p selected components are selected on a first-come, first-served basis.

9. The method of claim 1, wherein the method is implemented in a device having one or more PMD compensators and further comprises the step of:
routing each of the remaining components to bypass all PMD compensators within the device.

10. The method of claim 1, wherein, for the step of selecting, $0 < p < n$.

11. An apparatus adapted to receive an optical signal having n components, where $n > 1$, comprising:
a polarization mode dispersion (PMD) monitor adapted to characterize PMD levels of the n components;
a controller adapted to select p of the n components based on the characterized PMD levels, where $0 \leq p < n$;
l PMD compensators, where $1 \leq l < n$, wherein said l PMD compensators are adapted to apply PMD-reduction processing to the p selected components; and
a decoder adapted to (i) decode each of the p selected components after the corresponding PMD-reduction processing and (ii) decode each of the remaining components without performing PMD-reduction processing thereupon, wherein the l PMD compensators are time-shared for the PMD-reduction processing, with at least one of the l PMD compensators being configurable to apply the PMD-reduction processing to different selections of components during different periods of time.

12. The apparatus of claim 11, wherein each of the l PMD compensators is configurable to apply the PMD-reduction processing to different selections of components during different periods of time.

13. The apparatus of claim 11, wherein the selection of the p components changes over time.

14. The apparatus of claim 13, wherein the value of p changes over time.

15. The apparatus of claim 11, further comprising a first optical switch having n input ports and m output ports, where $m \geq n$ wherein:
the decoder has m input ports and n output ports;
each input port of the first optical switch is configured to receive an optical signal corresponding to a different component;
the m output ports of the first switch are coupled to the m input ports of the decoder, wherein l output ports of the first switch are coupled to l input ports of the decoder via the l PMD compensators; and
the decoder is configured to generate n decoded signals corresponding to the n components.

16. The apparatus of claim 15, wherein the decoder comprises:
a second optical switch having m input ports, each corresponding to an input port of the decoder, and n output ports; and
a receiver away including n receivers, each coupled to the corresponding output port of the second switch and configured to generate the corresponding decoded signal.

17. The apparatus of claim 15, wherein the decoder comprises:
a receiver away including m receivers, each coupled to the corresponding input port of the decoder; and
a selector switch having m input ports, each coupled to the corresponding receiver, and n output ports, wherein the selector switch is configured to select n receiver outputs to generate the n decoded signals.

18. The apparatus of claim 15, wherein the first switch comprises l optical tunable filters, each coupled to the corresponding PMD compensator.

19. The apparatus of claim 11, wherein:
each component of the optical signal corresponds to a communication channel;
the l PMD compensators comprise first and second PMD compensators;
the first PMD compensator is configured to receive a first multiplexed optical signal corresponding to a first selection of optical channels; and
the second PMD compensator is configured to receive a second multiplexed optical signal corresponding to a second selection of optical channels different from the first selection.

20. The apparatus of claim 19, wherein the first selection has odd-numbered communication channels and the second selection has even-numbered communication channels.

21. The apparatus of claim 11, wherein each of the remaining components is routed to bypass all PMD compensators within the apparatus.

22. The apparatus of claim 11, wherein the controller is adapted to select the p of the n components, $0 < p < n$.

23. A method of processing an optical signal having n components, where $n > 1$, the method comprising:
applying the optical signal to a device including l polarization mode dispersion (PMD) compensators, where $1 \leq l < n$; and
subjecting the optical signal to PMD-reduction processing, wherein said l PMD compensators are time-shared for said processing, with each of the l PMD compensators being configurable to apply the PMD-reduction processing to different selections of components during different periods of time.

24. An apparatus adapted to receive an optical signal having n components, where $n > 1$, comprising l PMD compensators, where $1 \leq l < n$ said l PMD compensators adapted to:
subject the optical signal to PMD-reduction processing; and
be time-shared for said processing, with each of said l PMD compensators being configurable to apply the PMD-reduction processing to a different selection of components during different periods of time.

25. An apparatus adapted to receive an optical signal having n components, where n>1, comprising:
- a polarization mode dispersion (PMD) monitor adapted to characterize PMD levels of the n components;
- a controller adapted to select p of the n components based on the characterized PMD levels, where $0 \leq p < n$;
- l PMD compensators, where $1 \leq l < n$, wherein said l PMD compensators are adapted to apply PMD-reduction processing to the p selected components;
- a first optical switch having n input ports and m output ports, where $m \leq n$ and
- a decoder having m input ports and n output ports, wherein:
    - each input port of the first optical switch is configured to receive an optical signal corresponding to a different component;
    - the m output ports of the first switch are coupled to the m input ports of the decoder, wherein l output ports of the first switch are coupled to l input ports of the decoder via the l PMD compensators; and
    - the decoder is configured to generate n decoded signals corresponding to the n components.

26. The apparatus of claim 25, wherein the decoder comprises:
- a second optical switch having m input ports, each corresponding to an input port of the decoder, and n output ports; and
- a receiver away including n receivers, each coupled to the corresponding output port of the second switch and configured to generate the corresponding decoded signal.

27. The apparatus of claim 25, wherein the decoder comprises:
- a receiver away including m receivers, each coupled to the corresponding input port of the decoder; and
- a selector switch having m input ports, each coupled to the corresponding receiver, and n output ports, wherein the selector switch is configured to select n receiver outputs to generate the n decoded signals.

28. The apparatus of claim 25, wherein the first switch comprises l optical tunable filters, each coupled to the corresponding PMD compensator.

* * * * *

UNITED STATES PATENT AND TRADEMARK OFFICE
CERTIFICATE OF CORRECTION

PATENT NO.         : 7,330,663 B2                                              Page 1 of 1
APPLICATION NO. : 10/425432
DATED               : February 12, 2008
INVENTOR(S)       : Randy C. Giles, Xiang Liu and Chongjin Xie It is certified that error appears in the above-identified patent and that said Letters Patent is hereby corrected as shown below:

In Column 10, on line 12, replace "away" with --array--.

In Column 10, on line 18, replace "away" with --array--.

In Column 12, on line 6, replace "away" with --array--.

In Column 12, on line 12, replace "away" with --array--.

Signed and Sealed this

Eighteenth Day of November, 2008

JON W. DUDAS
*Director of the United States Patent and Trademark Office*